(12) United States Patent
Simons et al.

(10) Patent No.: US 12,444,917 B2
(45) Date of Patent: Oct. 14, 2025

(54) CABLE ARREST DEVICE

(71) Applicant: Imaging Brands, Inc., Phoenix, AZ (US)

(72) Inventors: Josh Simons, Phoenix, AZ (US); Stephen Lambert, Phoenix, AZ (US)

(73) Assignee: Imaging Brands, Inc.

( * ) Notice: Subject to any disclaimer, the term of this patent is extended or adjusted under 35 U.S.C. 154(b) by 412 days.

(21) Appl. No.: 17/866,458

(22) Filed: Jul. 15, 2022

(65) Prior Publication Data

US 2023/0335983 A1    Oct. 19, 2023

Related U.S. Application Data

(60) Provisional application No. 63/331,782, filed on Apr. 15, 2022.

(51) Int. Cl.
*H02G 15/007* (2006.01)

(52) U.S. Cl.
CPC .................. *H02G 15/007* (2013.01)

(58) Field of Classification Search
CPC ........ H02G 15/007; H02G 11/00; H02G 15/00
USPC ............................................. 174/135
See application file for complete search history.

(56) References Cited

U.S. PATENT DOCUMENTS

2021/0213811 A1*  7/2021  Ishigaki .................... B60J 5/06

OTHER PUBLICATIONS

Gustafson et al., WO 99/16301 (Apr. 8, 1999) (Year: 1999).*

* cited by examiner

*Primary Examiner* — Tremesha W Burns
(74) *Attorney, Agent, or Firm* — Thomas W. Galvani, P.C.; Thomas W. Galvani

(57) ABSTRACT

A cable arrest device for securing a cable includes a dock, a base removably coupled to the dock, a cap removably coupled to the base, and a gate formed between the base and cap, the gate having a dimension and being configured to receive the cable therethrough, wherein relative movement of the cap and the base adjusts the dimension of the gate.

20 Claims, 14 Drawing Sheets

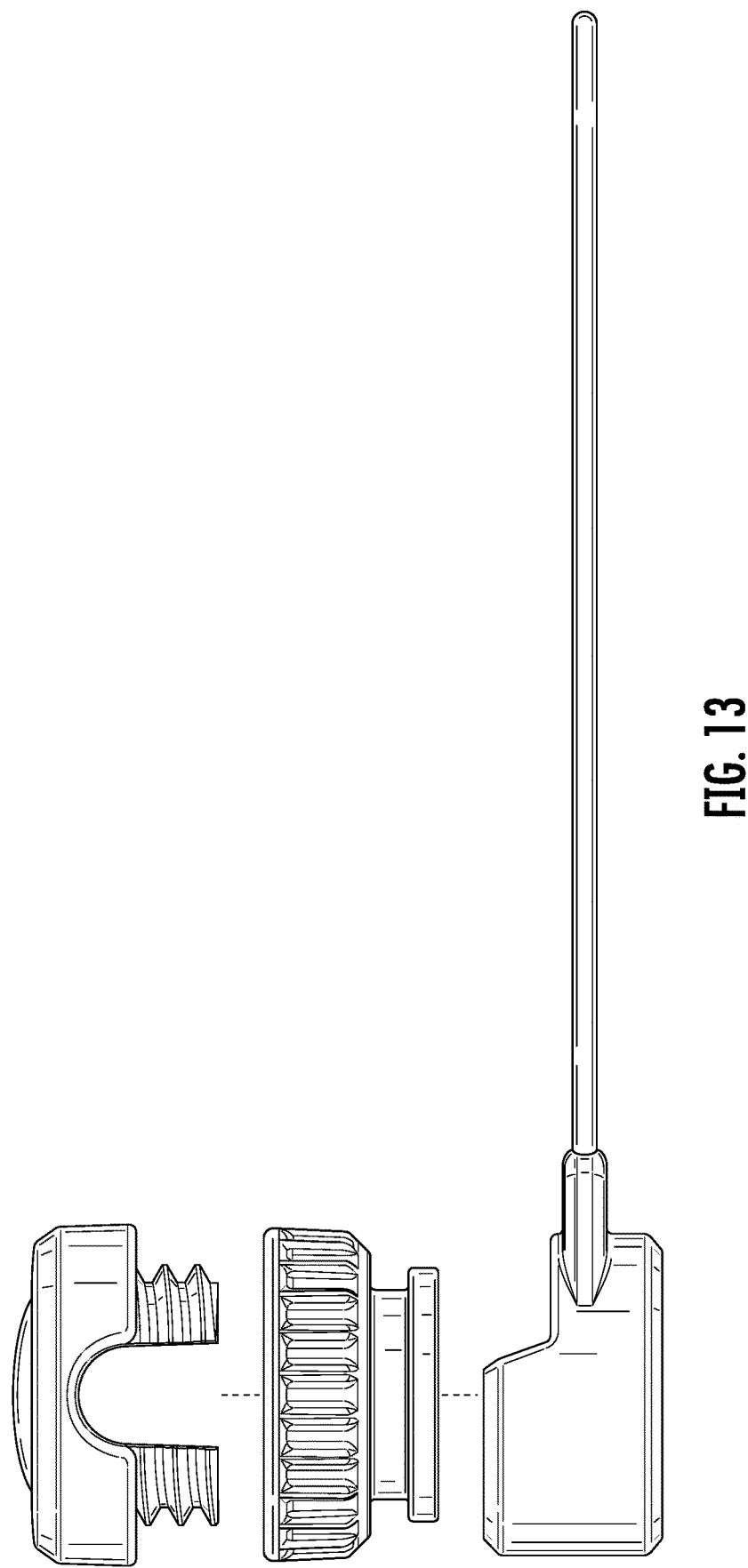

CABLE ARREST DEVICE

CROSS-REFERENCE TO RELATED APPLICATIONS

This application claims the benefit of U.S. Provisional Application No. 63/331,782, filed Apr. 15, 2022, which is hereby incorporated by reference.

FIELD

The present specification relates generally to electronics, and more particularly to electronic cables.

BACKGROUND

We attach cables to most of our electronics. Cables transmit data from one end to another, coupling two devices in data communication with each other. Cables also physically couple devices together.

Rarely is a cable the perfect length, extending just long enough between one device and another, without slack and without being stretched. Generally, when we select a cable, we pick one that is slightly longer than needed, to ensure that it is long enough. A longer cable leaves slack or loops.

Slack in a cable is usually at least an annoyance. It is unsightly and appears disorganized. When a cable is longer than it needs to be, many people will tie up, tape, or collect the extra cable and attempt to organize it. Loose cable can be irksome if someone accidentally catches a cable and pulls it loose from its connection.

Sometimes, however, any slack could pose a hazard to a device. Cable that hangs off the edge of a desk, or that projects out from a laptop or camera, presents a risk. For example, someone walking by a camera on a tripod may inadvertently catch a loop of cable between a camera and a nearby laptop. If they don't realize it quickly enough, they may topple the camera or pull the camera off its desk, causing thousands of dollars of damage. Because devices that are connected by cables are often lightweight, like cameras and laptops, it is quite easily to accidentally pull a device off its stand before being aware you have caught the cable.

A solution to grounding or securing cables is needed.

SUMMARY

In an embodiment, a cable arrest device for securing a cable includes a dock, a base removably coupled to the dock, a cap removably coupled to the base, and a gate formed between the base and cap, the gate having a dimension and being configured to receive the cable therethrough, wherein relative movement of the cap and the base adjusts the dimension of the gate.

The dock includes a first hold and a second hold disposed on opposite sides of the dock. When the base is in the first hold, the base is removable from the first hold in only a single first direction, and when the base is in the second hold, the base is removable from the second hold in only a second direction transverse to the first direction. The dock includes an endwall between the two opposite sides of the dock, the endwall having a perimeter. The first hold includes a cylindrical sidewall extending upward from the endwall and extending continuously around the perimeter, and the second hold includes a quasi-cylindrical sidewall extending upward from the endwall and extending partially around the perimeter. The second hold includes an overhanging lip formed on an edge of the quasi-cylindrical sidewall, which overhanging lip is directed radially inward into the second hold. The base includes a stem terminating with a flange, and the flange fits under the overhanging lip when the base is coupled to the dock. The cap includes an enlarged head and a threaded shank depending from the head. The base includes a cup configured to receive the shank of the cap. A slot severs the shank and partially severs the head of the cap, and when the base receives the cap, the slot of the cap cooperates with the base to form the gate. The slot defines a semi-circular bore in the head of the cap.

In an embodiment, a cable arrest device for securing a cable includes a dock, a lock assembly having a base and cap removably coupled to each other. The lock assembly includes a gate with a dimension adjustable in response to relative movement of the base and the cap, the gate configured to receive the cable therethrough. The dock receives the lock assembly to non-permanently engage the lock assembly to the dock.

When the lock assembly is engaged to the dock, only a force of a defined magnitude and orientation disengages the lock assembly and the dock. When the lock assembly is engaged to the dock, decoupling of the lock assembly and dock is disabled without a force of defined magnitude and orientation. The dock includes a first hold and a second hold disposed on opposite sides of the dock, and when the base is in the first hold, the base is removable from the first hold in only a single first direction, and when the base is in the second hold, the base is removable from the second hold in only a second direction transverse to the first direction. The dock includes an endwall between the two opposite sides of the dock, the endwall having a perimeter. The first hold includes a cylindrical sidewall extending upward from the endwall and extending continuously around the perimeter, and the second hold includes a quasi-cylindrical sidewall extending upward from the endwall and extending partially around the perimeter. The second hold includes an overhanging lip formed on an edge of the quasi-cylindrical sidewall which is directed radially inward into the second hold, and the base includes a stem terminating with a flange, and the flange fits under the overhanging lip when the base is coupled to the dock. The cap includes an enlarged head and a threaded shank depending from the head, and the base includes a cup configured to receive the shank of the cap. A slot severs the shank and partially severs the head of the cap, and when the base receives the cap to form the lock assembly, the slot of the cap cooperates with the base to form the gate.

In an embodiment, a cable arrest device for securing a cable includes a dock and a lock assembly having a base and a cap removably coupled to each other. The lock assembly includes a gate with a dimension adjustable in response to relative movement of the base and the cap, the gate configured to receive the cable therethrough. When the lock assembly is received by the dock, decoupling of the lock assembly and dock is disabled without a force of sufficient magnitude and particular orientation.

The dock includes a first hold and a second hold disposed on opposite sides of the dock. When the base is in the first hold, the base is removable from the first hold in only a single direction, and when the base is in the second hold, the base is removable from the second hold in only a second direction transverse to the first direction. The dock includes an endwall between the two opposite sides of the dock, the endwall having a perimeter. The first hold includes a cylindrical sidewall extending upward from the endwall and extending continuously around the perimeter, and the second hold includes a quasi-cylindrical sidewall extending upward from the endwall and extending partially around the perimeter. The second hold includes an overhanging lip formed on an edge of the quasi-cylindrical sidewall which is directed radially inward into the second hold. The base includes a stem terminating with a flange, and the flange fits under the overhanging lip when the base is coupled to the dock. The cap includes an enlarged head and a threaded shank depending from the head, and the base includes a cup configured to receive the shank of the cap. A slot severs the shank and partially severs the head of the cap, and when the base receives the cap to form the lock assembly, the slot of the cap cooperates with the base to form the gate. The slot defines a semi-circular bore in the head of the cap.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings:

FIGS. 10-15 are, respectively, a top plan view, bottom plan view, right side elevation view, left side elevation view, front elevation view, and rear elevation view of a cable arrest device.

DETAILED DESCRIPTION

Figure 1:
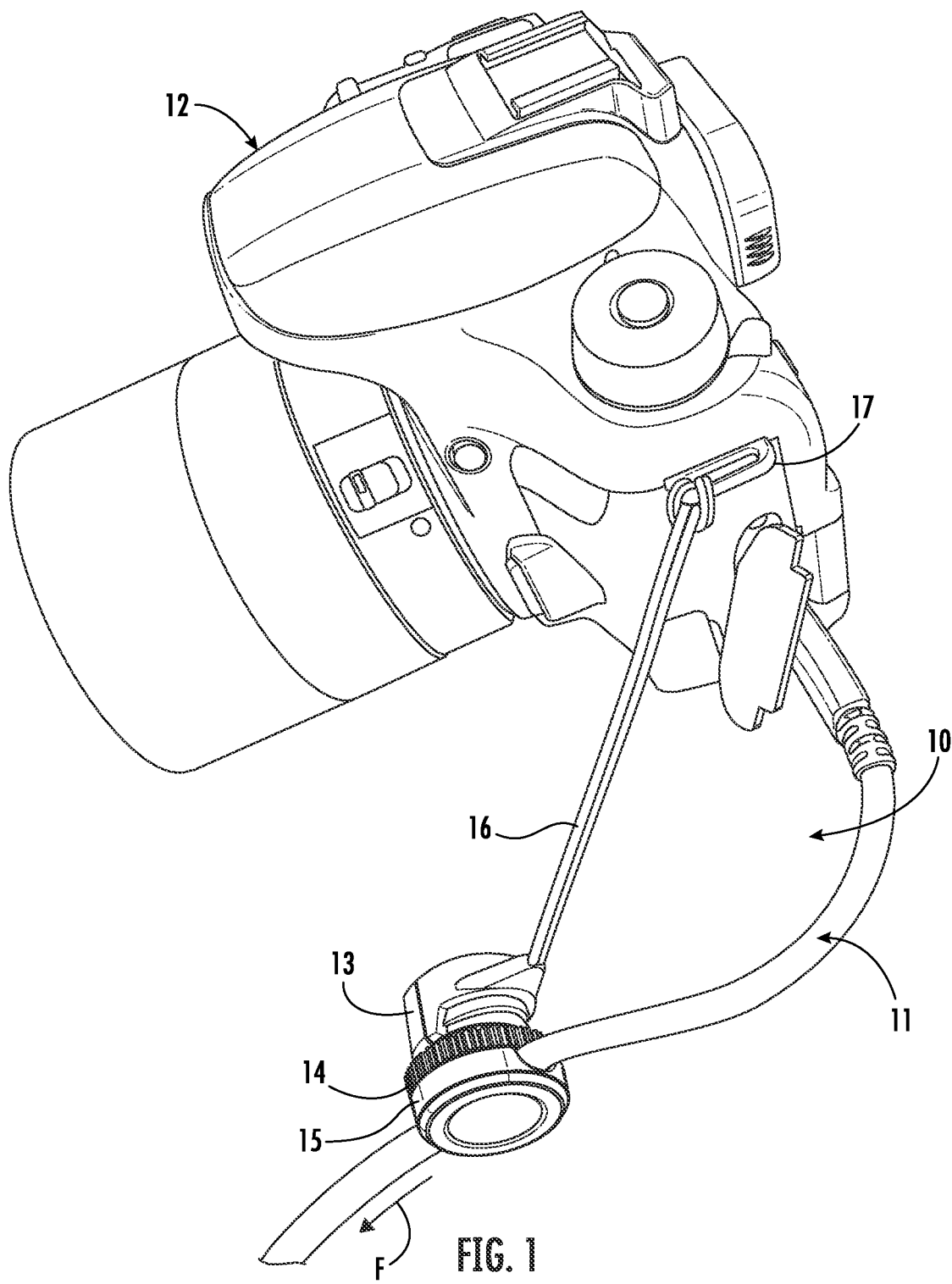
FIG. 1 is a perspective view of a cable arrest device on an electronic device.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

FIG. 1 illustrates a cable arrest device 10 secured to a cable 11 coupled to a camera 12. The cable arrest device 10 effectively prevents the cable 11 from being accidentally removed from the camera 12, saving the photographer the annoyance of having to reconnect the cable 11 each time it would otherwise inadvertently be pulled out. The camera 12 is only exemplary of a device that contains a communications or data port, such as a laptop or tablet, and the cable 11 is exemplary of any cable, such as a USB cable, optical cable, or the like. The scope of the disclosure is not limited by these examples.

The cable arrest device 10 (hereinafter, the "device 10") includes a dock 13, a base 14 applicable to the dock 13, and a cap 15 applicable to the base 14. The cap 15 and base 14 form a hold that receives the cable 11 and can be tightened or closed to secure the cable 11 in the device 10. A leash 16 extends from dock 13 and is coupled to the camera 12 to ensure the device 10 stays near the camera 12. The dock 13 has two sides, both of which can receive the base 14. When the base 14 is applied to one side and the cable 11 is tugged away from the camera 12, the device 10 will not separate unless the force of the tug exceeds a threshold level. When the base 14 is applied to the other side and the cable 11 is tugged, the device 10 will not separate at all.

Figure 2A:
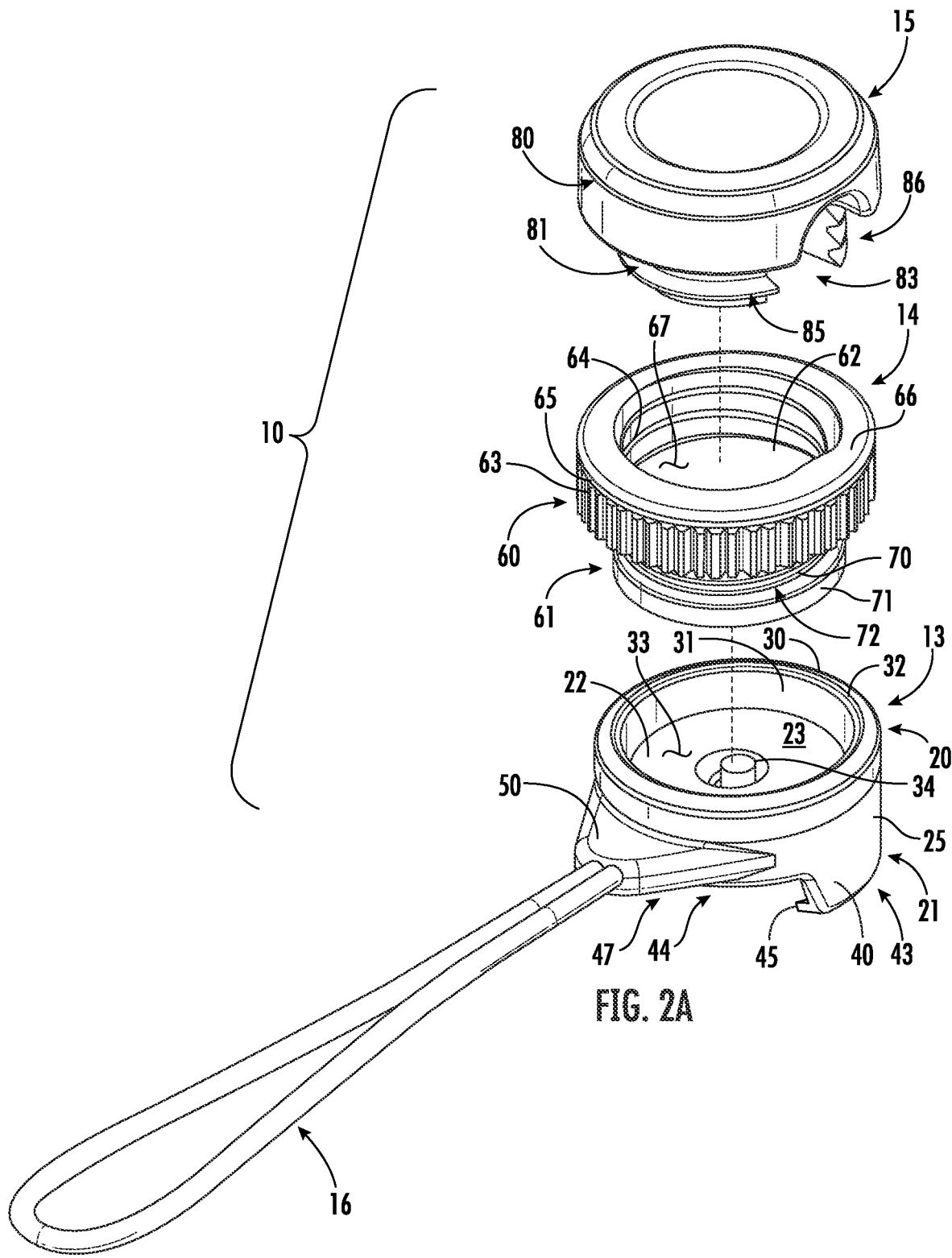
FIGS. 2A, 2B, and 3 are exploded perspective views of the cable arrest device of FIG. 1.
Figure 2B:
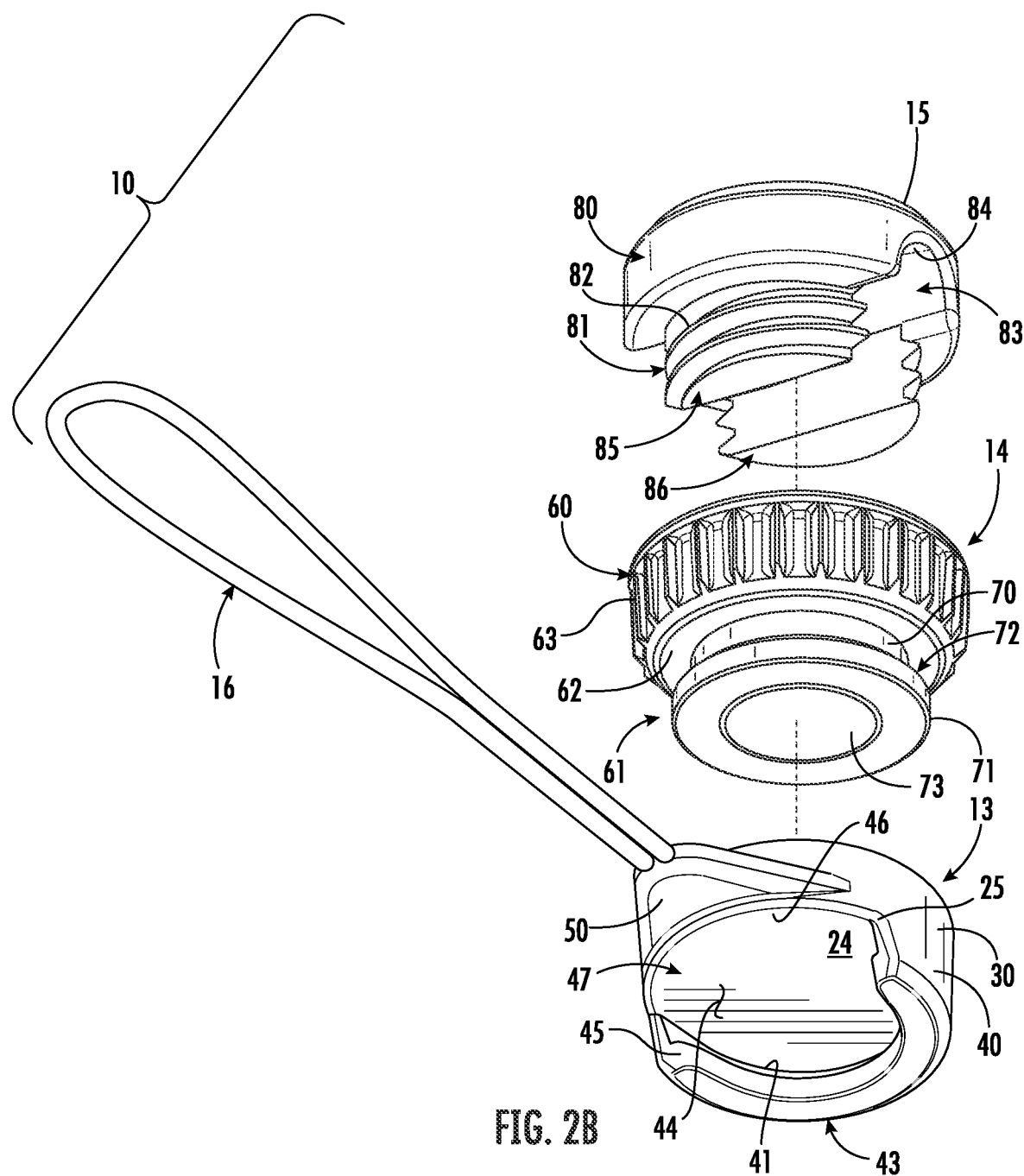

FIGS. 2A and 2B show the device 10 in exploded top and bottom perspective views. The dock 13 has a body which is roughly cylindrical, having a preferably circular cross-section. The dock 13 has a first side 20 and an opposed second side 21 extending in opposite directions from a flat, thin, round endwall 22. The endwall 22 is thus between the first and second sides 20 and 21, and it has opposed first and second surfaces 23 and 24 on the first and second sides 20 and 21, respectively. The first and second surfaces 23 and 24 are substantially flat and parallel with respect to each other, and each defines the floor or bottom of a seat for its respective first or second side 20 or 21.

On the first side 20, a sidewall 30 projects upwardly from the endwall 22 at a perimeter 25 thereof. The sidewall 30 extends continuously around the perimeter 25. The sidewall has an inner surface 31 which is smooth and cylindrical. The inner surface 31 is preferably normal to the endwall 22 and has a constant inner diameter. The sidewall 30 rises up to an edge 32 defining the top of the first side 20 furthest from the endwall 22. The endwall 22 and the sidewall 30 cooperate to define a first hold 33 in the first side 20. The first hold 33 is an empty space or void for receiving the base 14 and is generally cylindrical. A magnetic element 34, or an element made of a magnetically-attractive material, is preferably carried in the endwall 22. In some embodiments, the magnetic element 34 covers the entire first surface 23 of the endwall 22. In other embodiments, the magnetic element 34 covers only a portion of the first surface 23. In other embodiments, the magnetic element 34 is located or set into the endwall 22. In the embodiment shown in FIGS. 2A and 2B, the magnetic element 34 is set into the endwall 22 at the geometric center of the first surface 23. In some embodiments, the magnetic element 34 is centrally disposed in the endwall 22 or is the endwall 22 itself.

On the second side 21, a sidewall 40 projects upwardly from the endwall 22 at the perimeter 25 thereof. In the view of FIG. 2A, the sidewall 40 actually projects downwardly as the reader views FIG. 2A, but the dock 13 has neither a defined upright position or a defined inverted position; either the first side 20 or the second side 21 can be oriented upwardly. The sidewall 40 has an inner surface 41 which is smooth and generally semi-cylindrical. That inner surface 41 is normal to the endwall 22 and has a constant inner diameter.

The sidewall 40 rises up to an edge 42 defining the top of the second side 21 furthest from the endwall 22. Along a back side of the dock 13, the sidewall 40 projects upward from the endwall 22; along a front side of the dock 13, there is preferably not a sidewall 40. As such, the sidewall 40 is severed or incomplete; it is semi- or quasi-cylindrical, extending only partially around the perimeter 25. The sidewall 40 along the back side of the dock 13 defines a back 43. The endwall 22 and the sidewall 40 cooperate to define a second hold 44 in the second side 21. The second hold 44 is an empty space or void for receiving the base 14 and is generally cylindrical. The second hold 44 has a mouth or vertical opening from above, but also has a lateral opening 47, defined between the ends of the sidewall 40, along the front side of the dock 13, where there is no sidewall 40.

Along the back 43, the sidewall 40 turns inwardly at the edge 42, defining a lip 45 projecting into the second hold 44. The lip 45 overhangs the second hold 44, extending slightly inward in a radial direction around the back 43. The lip 45 helps capture the base 14 when applied to the second hold 44.

In some embodiments, a magnetic element 46, or an element made of a magnetically-attractive material, is preferably carried in the endwall 22. In some embodiments, the magnetic element 46 covers the entire second surface 24 of the endwall 22. In other embodiments, the magnetic element 46 covers only a portion of the second surface 24. In other embodiments, the magnetic element 46 is located or set into the endwall 22. In the embodiment shown in FIGS. 2A and 2B, the magnetic element 46 is set into the endwall 22 at the geometric center of the second surface 24. In some embodiments, the magnetic element 46 is centrally disposed in the endwall 22 or is the endwall 22 itself. In other embodiments, only a single magnetic element 34, 46 is carried in or on the endwall 22 and is effective for retaining the base 14 in both the first and second holds 33 and 44.

Extending laterally outward from the side of the dock 13 is a projection 50. The projection 50 is formed integrally and monolithically to the dock 13 and constitutes part of the dock 13. The leash 16 is secured in the projection 50. In the embodiment shown here, the projection 50 is actually formed or molded over a proximal end of the leash 16, thereby securing the leash in the projection 50. In other embodiments, the leash 16 is tied or otherwise secured to the projection 50.

The base 14 is applicable to either side 20 or 21 of the dock 13. When the base 14 is applied to the first side 20 of the dock 13, the base 14 can be removed from the dock 13 by pulling the base 14 generally vertically out of the first hold 33 with a sufficient amount of force to overcome the magnetic attraction force of the magnetic element 34 (or magnetic element 46, as will be understood hereafter). The base 14 generally resists removal from the first hold 33 in a lateral direction because of interaction between the base 14 and the sidewall 30. When the base 14 is applied to the second side 21 of the dock 13, the base 14 is secured to the dock 13 and resists almost all types of separating movement, regardless of applied force. In that condition, engagement of the lip 45 of the second side 21 captures the base 14 and prevents separation of the base 14 and dock 13.

The base 14 includes a socket or cup 60 and a stem 61 projecting downwardly from the cup 60. The cup 60 receives the cap 15, and the stem 61 is received by the dock 13.

The cup 60 includes an endwall 62, which is a generally flat and thin cylindrical base at the bottom of the cup 60. A sidewall 63 projects upwardly from the endwall 62 at the perimeter thereof. The sidewall 63 is preferably normal to the endwall 62 and has opposed inner and outer surfaces 64 and 65. The inner surface 64 is threaded, and the outer surface preferably is knurled or carries other texture to improve grip on the sidewall 63. The sidewall 63 rises up from the endwall 62 to an edge 66. The edge 66 is continuous, flat, blunt, and relatively thick. The sidewall 63 cooperates with the endwall 62 to define a hold 67 to receive the cap 15. That hold 67 is generally cylindrical in shape. The edge 66 defines the top of the hold 67.

The stem 61 extends downward from the endwall 62 of the cup 60. The stem 61 includes a cylindrical neck 70 terminating in a flange 71. The neck 70 projects downwardly normal to the endwall 62 and has an outer diameter which is smaller than that of the sidewall 63. The flange 71 is an annular flange extending radially outward entirely around the neck 70, with an outer diameter larger than that of the neck 70 but smaller than that of the sidewall 63. As such, a channel 72 exists on the stem 61, encircling the neck 70, extending inward and flanked above by the endwall 62 and below by the flange 72. On the bottom of the stem 61 is a magnetic element 73, preferably flush with the flange 72. When the base 14 is proximate the dock 13, the magnetic element 73 in the base 14 is attracted to the magnetic element 34 in the dock 13.

The cap 15 fits into the hold 67 of the base 14. When the cable 11 is placed between the cap 15 and the base 14, the cap 15 can be tightened onto the base 14 to secure the cable 11 in the device 10, or to secure the device 10 onto the cable 11.

The cap 15 has a head 80 at its top and a shank 81 depending downward from the head 80. The head 80 is enlarged and has a larger outer diameter than the shank 81. The shank 81 projects downwardly from the underside of the head 80, normal thereto, and has a constant outer diameter, but for outwardly-directed threads 82 on its outer surface. The threads 82 are complemental to the threaded inner surface 64 of the base 14.

Figure 4:
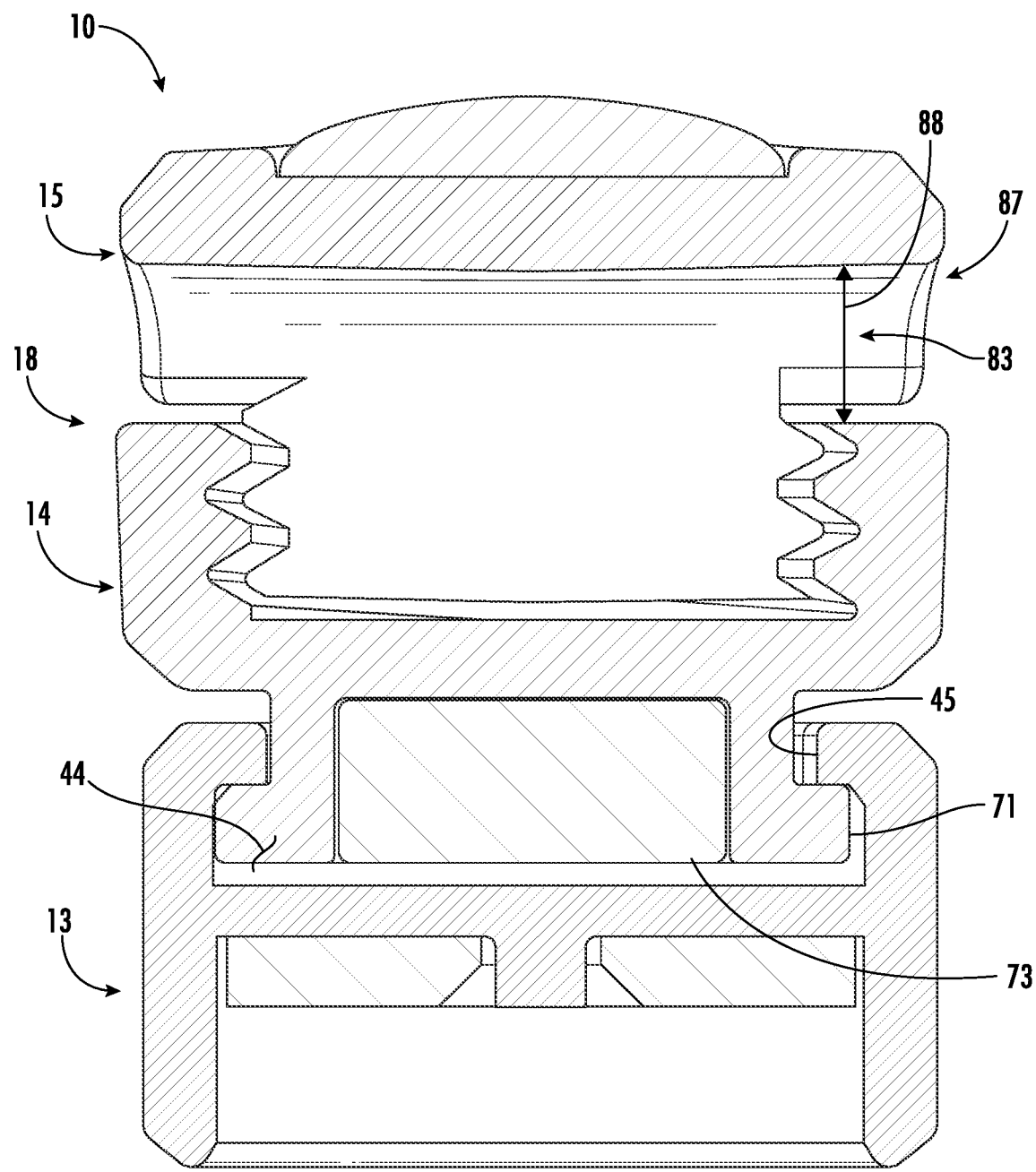
FIG. 4 is a section view taken along the line 4-4 in FIG. 3.
Figure 5:
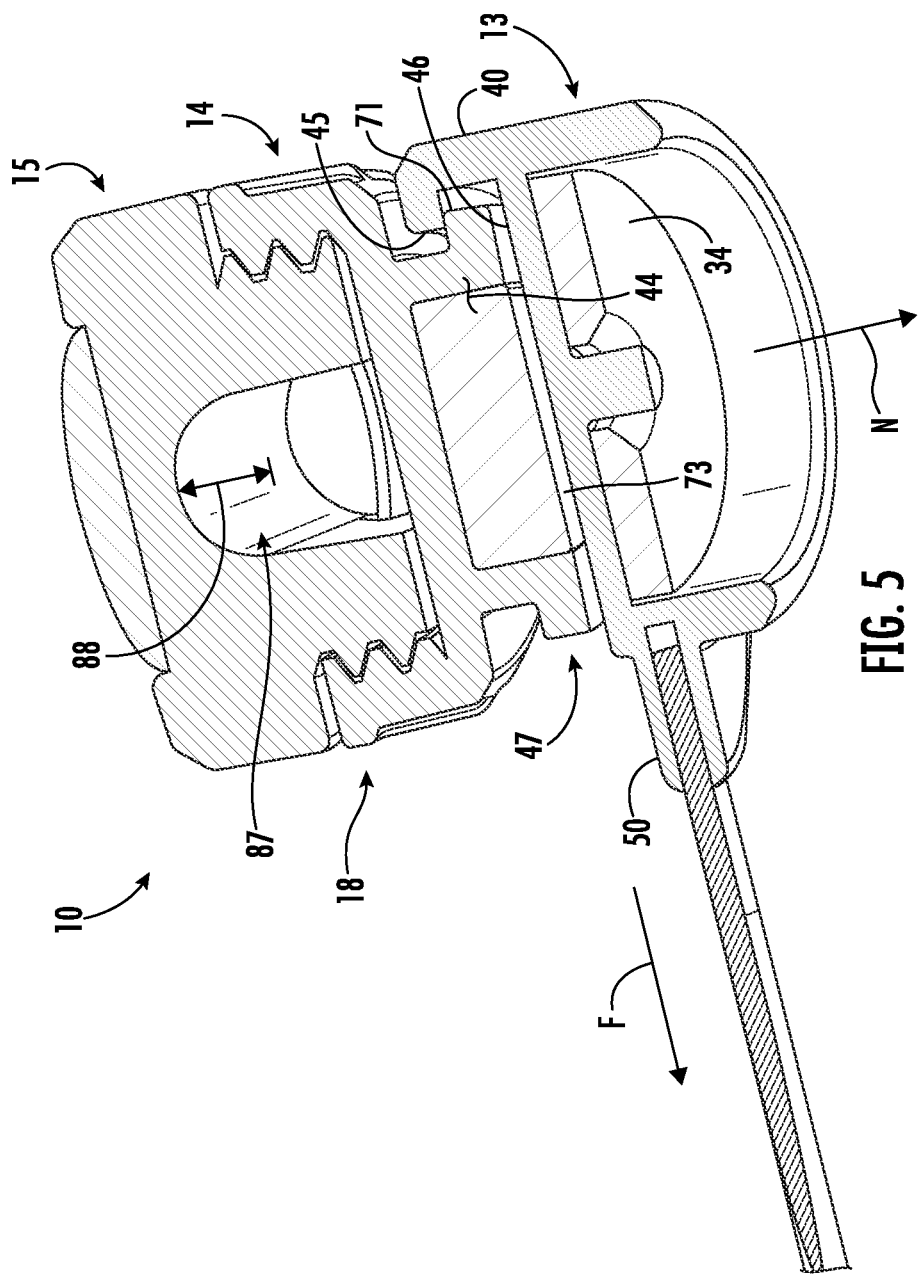
FIG. 5 is a section view taken along the line 5-5 in FIG. 3.

The shank 81 is entirely severed—and the head 80 is partially severed—by a slot 83. The slot 83 extends diametrically entirely through the shank, severing the shank 81 into two portions or legs 85 and 86. The legs 85 and 86 are identical and mirror opposite on either side of the slot 83. The slot 83 interrupts the head 80 partially. The slot 83 extends approximately halfway up into the head 80 where it forms a roughly semi-circular bore 84 which preferably corresponds to the outer diameter of the cable 11. When the cap 15 is engaged with the base 14, the slot 83 and the edge 32 define a gate 87 (shown in FIGS. 4 and 5) having a dimension 88 between the edge 32 and the bore 84. In FIGS. 4 and 5, that dimension 88 is a vertical dimension but it need not necessarily be a vertical dimension. The dimension 88 is adjustable and is adjusted by moving the cap 15 and base 14 relative each other. Moving the cap 15 further into the base 14 preferably reduces the dimension 88, while moving the cap 15 out of the base 14 preferably enlarges the dimension 88. In other words, movement of the base 14 and cap 15 changes the size and/or shape of the gate 87.

In operation, the device 10 is useful for preventing a cable from being yanked or forcefully pulled when coupled to a device such as a camera, tablet, laptop, or other item. In one method of operation, the dock 13 is first secured to the camera 12 by looping the leash 16 through any suitable anchor point 17, as shown in FIG. 1. This securely connects the device 10 to the camera 12 (or other device, as the case may be). The base 14 and cap 15 are then both taken up by hand and placed on either side of the cable 11.

The photographer places the cable 11 into the slot 83 in the cap 15, preferably nesting it upwards against the bore 84 in the underside of the head 80. Then, the photographer registers and directs the threaded shank 81 of the cap 15 toward the cup 60, moving the shank 81 into the cup and then rotating them relatively so as to threadably engage the shank 81 and cup 60. The photographer rotates and threadably engages the base 14 and cap 15 to each other until he believes the cable 11 is appropriately secured in the gate 87. Compression between the bore 84 of the cap 15 and the edge 66 of the base 14 secures the cable 11; the cable 11 becomes caught on one side by the bore 84 and on the opposing side by the edge 66. If desired, the photographer can gently tug on the cable 11 while holding the coupled base 14 and cap 15 to see if the cable 11 does move with respect to the base 14 and cap 15. If it does slip, the photographer may wish to rotate and tighten the cap 15 onto the base 14 a little more. Coupling the base 14 and the cap 15 together defines the base 14 and cap 15 as a lock assembly 18.

When the photographer has secured the cable 11 as desired in the gate 87 formed between the base 14 and cap 15, he can connect that lock assembly 18 to the dock 13, either on the first side 20 or the second side 21.

If the photographer desires to connect the lock assembly 18 to the first side 20 of the dock 13, he first takes up the dock 13 in his hand, holding the first side 20 up so that it is available to receive the base 14. The first side, as best shown in FIG. 2A, has the open first hold 33 for receiving the base 14. The first hold 33 is bound by the smooth, cylindrical, inner surface 31 of the sidewall 30.

The photographer then additionally grasps the assembled base 14, cap 15, and cable 11, and directs the base 14 downward toward the dock 13. The outer diameter of the flange 71 is just slightly smaller than the inner diameter of the first hold 33, but the outer diameter of the cup 60 is greater than the inner diameter of the first hold 33. The vertical distance between the bottom of the base 14 and the underside of the cup 60 corresponds to the height of the sidewall 30 between the first surface 23 and the edge 32 on the dock 13. As such, the first hold 33 is sized and shaped to closely receive the entire stem 61 of the base 14.

The photographer moves the base 14 down over the dock 13 so that it is registered therewith, then moves the stem 61 into the first hold 33. Magnetic attraction between the magnetic elements 34 and 73 causes the stem 61 to snap into the first hold 33, thereby securely seating the base 14 in the dock 13. Because the cap 15 is engaged to the base 14 and the cable 11 is captured between the base 14 and the cap 15, the cable 11 is now secured with respect to the dock 13.

When so secured, the base 14 is not readily removed from the dock 13. Referring to FIG. 1, if a force is suddenly applied to the cable, such as along line F by a tug or jerk, the base 14 will remain in the dock 13, the dock 13 will move with the base 14 and cap 15 in the direction of the line F, and the leash 16 will stretch along line F. The leash 16 stretches to a point of maximum elongation, which may be very close to its length if the leash 16 is inelastic.

If, referring to FIG. 5 briefly, the device 10 is oriented by the tug force such that the first hold 33 is oriented along the line N or somewhat near to along the line N, such that the line N extends normally (or near to) out of the first hold 33, then the base 14 may decouple from the dock 13. When this happens, only a force of sufficient magnitude and direction to overcome the magnetic attraction between the magnetic elements 34 and 73 will be capable of decoupling the base 14 and dock 13. If the tug force is less than that magnitude, then the device 10 remains intact. The direction of line N is generally normal to the direction of line F, and it is along these lines generally that the base 14 can only be removed from the dock 13. The photographer may choose a device 10 with a higher or lower magnetic attractive force between the dock 13 and base 14, depending on the situation. In some cases, the photographer may want the base 14 to break readily from the dock 13, while in other situations, he may want the device 10 to resist all but the strongest tug forces.

If the device 10 is oriented by the tug force along line F such that the first hold 33 is oriented largely transverse to the line F (such that the line F is parallel (or nearly parallel) to the first surface 23), then the base 14 may not decouple from the dock 13 except with only a very high tug force. When so oriented, the tug force pulls the flange 71 laterally—or nearly laterally—into and in confrontation with the inner surface 31 of the sidewall 30. The cable 12 is just above the sidewall 30, such that the edge 66 acts as a pivot or fulcrum point for the tug force along line F. This means that any force acting to remove the base 14 from the dock 13 becomes a vector component of the tug force F, which means the tug force F itself must be very large to have a vector component force sufficient to overcome the magnetic attraction force between the magnetic elements 34 and 73.

Figure 3:
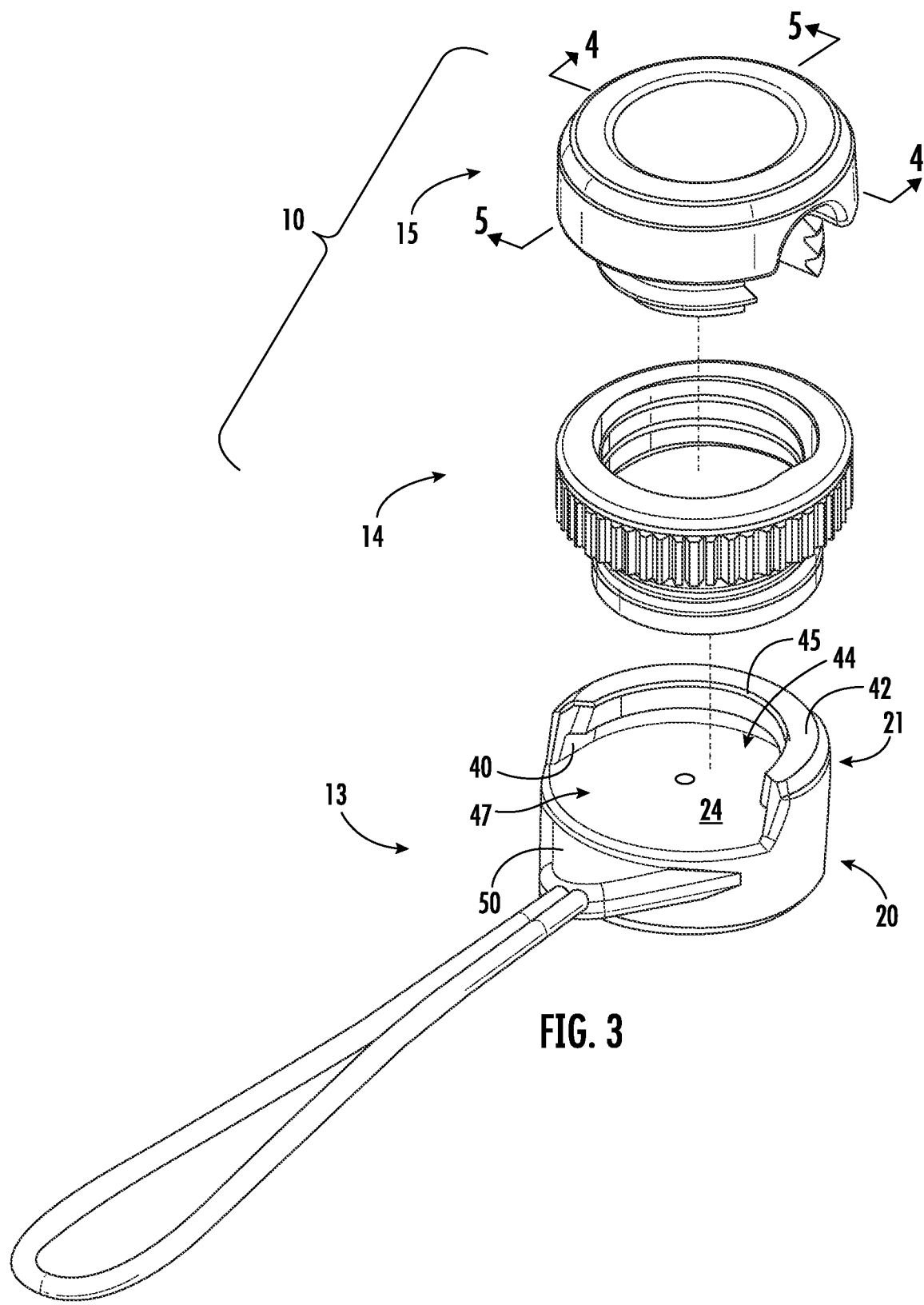

The photographer may instead desire to connect the lock assembly 18 to the second side 21 of the dock 13 rather than the first side 20. If so, then he first takes up the dock 13 in his hand, holding the second side 21 up so that it is available to receive the base 14. The second side 21, as best shown in FIG. 3, has the open second hold 44 for receiving the base 14. The second hold 44 is bound by the smooth, cylindrical, inner surface 41 of the sidewall 40 and the overhanging lip 45.

The photographer then additionally grasps the assembled base 14, cap 15, and cable 11, and directs the base 14 downward toward the dock 13. The outer diameter of the flange 71 is just slightly smaller than the inner diameter of the second hold 44, but the outer diameter of the cup 60 is greater than the inner diameter of the second hold 44. The vertical distance between the bottom of the base 14 and the underside of the cup 60 corresponds to the height of the sidewall 40 between the second surface 24 and the edge 42 on the second side 21 of the dock 13. As such, the second hold 44 is sized and shaped to closely receive the entire stem 61 of the base 14.

The photographer moves the base 14 down over the dock 13 but slightly offset from the second hold 44. The base 14 is moved downward onto the projection 50 and then into the lateral opening 47 of the second hold 44, only partially over the second surface 24. With the bottom of the base 14 in contact with the projection 50, the photographer then slides the base 14 laterally across the projection 50, through the lateral opening 47, and across the second surface 24. At a point, magnetic attraction between the magnetic elements 46 and 73 causes the stem 61 to snap laterally into the second hold 44, thereby securely seating the base 14 in the dock 13.

The base 14 is further secured in the dock 13 by the lip 45. FIG. 4 shows a section view taken along the line 4-4 in FIG. 3 (the cable 11 is not shown in the slot 83 for clarity of the illustration). As shown there, the cap 15 is secured in the base 14 with the threaded engagement therebetween. The base 14 is secured in the dock 13 by the engagement between the flange 71 and the lip 45. FIG. 4 clearly shows that the flange 71 fits under the lip 45. The inner diameter defined by the lip 45 is smaller than the outer diameter defined by the flange 71. The lip 45 therefore prevents the flange 71 from being moved upwardly out of the second hold 44; if a jerk pulls the base 14 upwardly, interaction of the flange 71 with the lip 45 entirely prevents removal of the base 14 from the dock 13. Because the cap 15 is engaged to the base 14, and the cable 11 is captured between the base 14 and the cap 15, the cable 11 is now secured with respect to the dock 13 on the second side 21.

When so secured, the base 14 is not removable from the dock 13 without precisely a certain type of orientation of the cable 11 and the dock 13. Referring to FIG. 5, which is a section view along the line 5-5 (and also does not show the cable 11 for clarity of the illustration), the view shows how the overhanging lip 45 interacts with the flange 71 to prevent upward movement of the base 14 off the dock 13. The magnetic attraction forces between the magnetic elements 73 and 34/46, and the engagement of the lip 45 and the flange 71, prevents decoupling of the base and dock 13.

Nevertheless, the base 14 can still be removed from the dock 13. The lip 45 overhangs the second hold 44 only along the back side of the dock 13; the sidewall 40 and lip 45 are both missing along the front side, where the lateral opening 47 is. As such, when the cable is oriented particularly such that the pull force along line F is directed outward through the lateral opening 47 (as shown in FIG. 5), the lock assembly 18 of the base 14 and cap 15 can be decoupled and removed from the dock 13 along that same direction. However, decoupling of the lock assembly 18 from the dock 13 is disabled without a force of sufficient magnitude and particular orientation. If the force along line F is directed along another orientation, the force will not decouple the base 14 from the dock 13.

Figure 6:
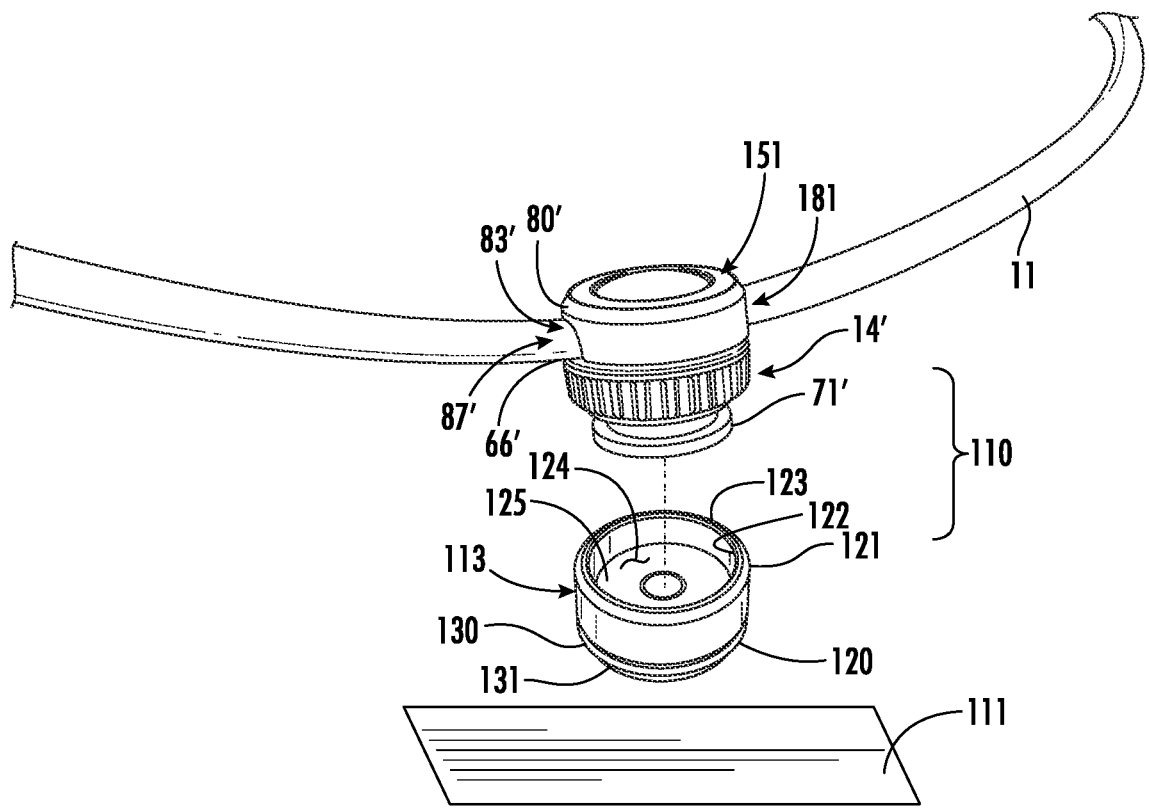
FIGS. 6 and 7 are perspective views of a cable arrest device on a cable.
Figure 7:
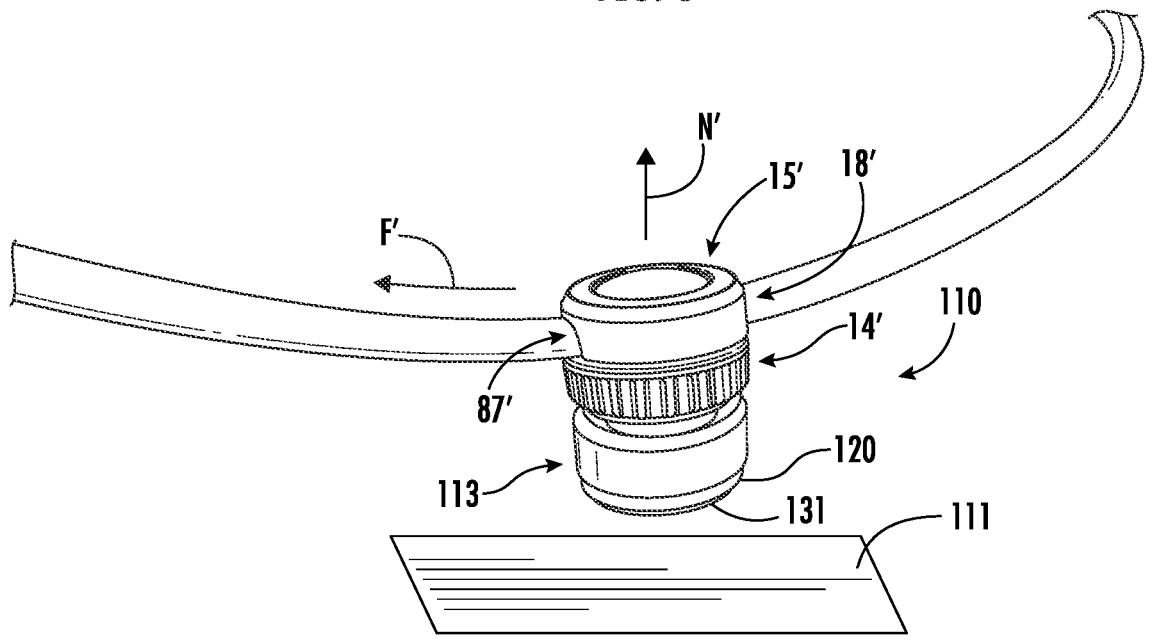

FIGS. 6 and 7 illustrate an alternate embodiment of a cable arrest device 110 secured on a cable 11. Like the cable arrest device 10, the device 110 holds a cable 11 and prevents downstream jerks or tugs from pulling the cable 11 and possibly damaging electronic devices. In the views of FIGS. 6 and 7, no electronic devices are pictured, but one end of the cable 11 is connected to an electronic device, such as a computer, and the other end is connected to an electronic device, such as a camera. The device 110 is preferably for securing the cable 11 to a tabletop 111 between these devices.

The device 110 includes many of the same structural elements and features as the device 10, and for that reason, same structural elements and features are referred to with the same reference characters as used with respect to the device 10, but are marked with a prime ("'") designation to differentiate the elements and features of device 110 from those of the device 10. For example, while the device 10 includes a base 14 and cap 15, the device 110 includes a base 14' and cap 15'. All constituent structural elements and features of the base 14 and cap 15 are present and identical on the base 14' and cap 15', respectively; they are the same in every way. Not all of those elements and features are indicated in FIGS. 6 and 7 as it would clutter the drawings, but the reader will readily understand their structure and location from the description with respect to the device 10.

The device 110 has a different dock from the device 10. The dock of the device 110 is designated with the reference character 113, and while it shares many of the same structures and elements with the dock 13, it is different.

The dock 113 has a body which is roughly cylindrical, having a preferably circular cross-section. The dock 113 has a bottom 120, and a sidewall 121 projects upwardly from the bottom 120 at the perimeter thereof. The sidewall 121 has an inner surface 122 which is smooth and cylindrical. The inner surface 122 is preferably normal to the bottom 120 and has a constant inner diameter. The sidewall 121 rises up to an edge 123 defining the top of the dock 133.

The bottom 120 and the sidewall 121 cooperate to define a hold 124 in the first side 20. The hold 124 is an empty space or void for receiving the base 14 and is generally cylindrical. A magnetic element 125, or an element made of a magnetically-attractive material, is preferably carried in the bottom 120. In some embodiments, the magnetic element 125 covers the upper surface of the bottom 120. In other embodiments, the magnetic element 120 covers only a portion of the upper surface of the bottom 120. In other embodiments, the magnetic element 125 is located or set into the bottom 120. In the embodiment shown in FIG. 6, the magnetic element 125 is set into the upper surface of the bottom 120 at the geometric center thereof. In some embodiments, the bottom 120 is partially or entirely formed by the magnetic element 125.

The bottom 120 has a lower surface 130 opposite its upper surface, and opposite the sidewall 121. Preferably, the lower surface 130 carries an adhesive 131, such as a sticky tape or very-high bond tape. The adhesive 131 securely attaches the dock 113 to a surface such as the tabletop 111 shown in FIGS. 6 and 7.

In operation, the device 110 is useful for preventing a cable from being yanked or forcefully pulled when coupled to a device such as a camera, tablet, laptop, or other item. In one method of operation, the dock 113 is first secured on a tabletop 111 by peeling a film off the adhesive 131, orienting the dock 113 bottom-side down, and then pressing the dock 113 against the tabletop 111. The reader is reminded here that the tabletop described here need not be an actual tabletop, but rather any substantially planar surface having at least a size and shape suitable to receive the adhesive bottom 120 of the dock 113. This could be a tabletop, but could also be the side of a counter, the underside of a shelf, the top of a post, the side of a speaker, etc. So long as the surface is capable of receiving the adhesive bottom 120 of the dock 113, it is considered to be included as a "tabletop 111."

Once the dock 13 is secured, it is preferably very difficult to remove accidentally. The very high bond of the adhesive 131 is resistant to almost all removal forces and methods other than the use of special solvents and tools. The base 14 and cap 15 are then both taken up by hand and placed on either side of the cable 11. The photographer places the cable 11 into the slot 83' in the cap 15', preferably nesting it upwards against the bore 84' in the underside of the head 80'. Then, the photographer registers and directs the threaded shank 81' of the cap 15' toward the cup 60', moving the shank 81' into the cup 60' and then rotating it so as to threadably engage the shank 81' and cup 60'. The photographer rotates and threadably engages the base 14' and cap 15' with respect to each other until he believes the cable 11 is appropriately secured in the gate 87'. Compression between the bore 84' of the cap 15' and the edge 66' of the base 14' secures the cable 11 in the gate 87'; the cable 11 becomes caught on one side by the bore 84' and on the opposing side by the edge 66'. If desired, the photographer can gently tug on the cable 11 while holding the coupled base 14' and cap 15' to see if the cable 11 does move with respect to the base 14' and cap 15'. If it does slip, the photographer may wish to rotate and tighten the cap 15' onto the base 14' a little more.

When the photographer has secured the cable 11 in the base 14' and cap 15' as desired, he can connect that lock assembly 18' to the dock 113. To do this, he simply takes up the lock assembly 18' in his hand and holds it above the dock 113. He directs the base 14' downward toward the dock 113. The outer diameter of the flange 71' is just slightly smaller than the inner diameter of the hold 124, but the outer diameter of the cup 60' is greater than the inner diameter of the hold 124. The vertical distance between the bottom of the base 14' and the underside of the cup 60' corresponds to the height of the sidewall 121 between the upper surface of the bottom 120 and the edge 123 on the dock 113. As such, the hold 124 is sized and shaped to closely receive the entire stem 61' of the base 14'.

The photographer moves the base 14' down over the dock 113 so that it is registered therewith, then moves the stem 61' into the hold 124. Magnetic attraction between the magnetic element 73' and 125 causes the stem 61' to snap into the hold 124, thereby securely seating the base 14' in the dock 113. Because the cap 15' is engaged to the base 14' and the cable 11 is captured between the base 14' and the cap 15', the cable 11 is now secured with respect to the dock 113.

When so secured, the base 14 is not readily removed from the dock 113. If a force is suddenly applied to the cable, such as in FIG. 7 along line F' by a tug or jerk, the base 14' will generally remain in the dock 113 and the dock 113 will resist the force.

If the device 110 is oriented by an upward tug force N such that the hold 124 is oriented along the line N' or somewhat nearly along the line N', then the base 14' may decouple from the dock 113. When this happens, only a force of sufficient magnitude and direction to overcome the magnetic attraction between the magnetic elements 125 and 73 will be capable of decoupling the base 14' and dock 113. If the tug force is less than that magnitude, then the device 110 remains intact. The direction of line N' is generally normal to the direction of line F', and it is along these lines generally that the base 14' can only be removed from the dock 113. The photographer may choose a device 110 with a higher or lower magnetic attractive force between the dock 113 and base 14', depending on the situation. In some cases, the photographer may want the base 14' to break from readily from the dock 113, while in other situations, he may want the device 110 to resist all but the strongest tug forces.

If the device 110 is oriented by the tug force along line F' such that the first hold 124 is oriented largely transverse to the line F' (as in FIG. 7), then the base 14 may not decouple from the dock 113 except with only a very high tug force. When so oriented, the tug force pulls the flange 71' laterally—or nearly laterally—into and in confrontation with the inner surface 122 of the sidewall 121. The cable 11 is just above the sidewall, such that the edge 66' acts as a pivot or fulcrum point for the tug force along line F'. This means any force acting to remove the base 14' from the dock 113 is a vector component of the tug force, which means the tug force F' itself must be very large to have a vector component force sufficient to overcome the magnetic attraction force between the magnetic elements 125 and 73'.

Figure 8:
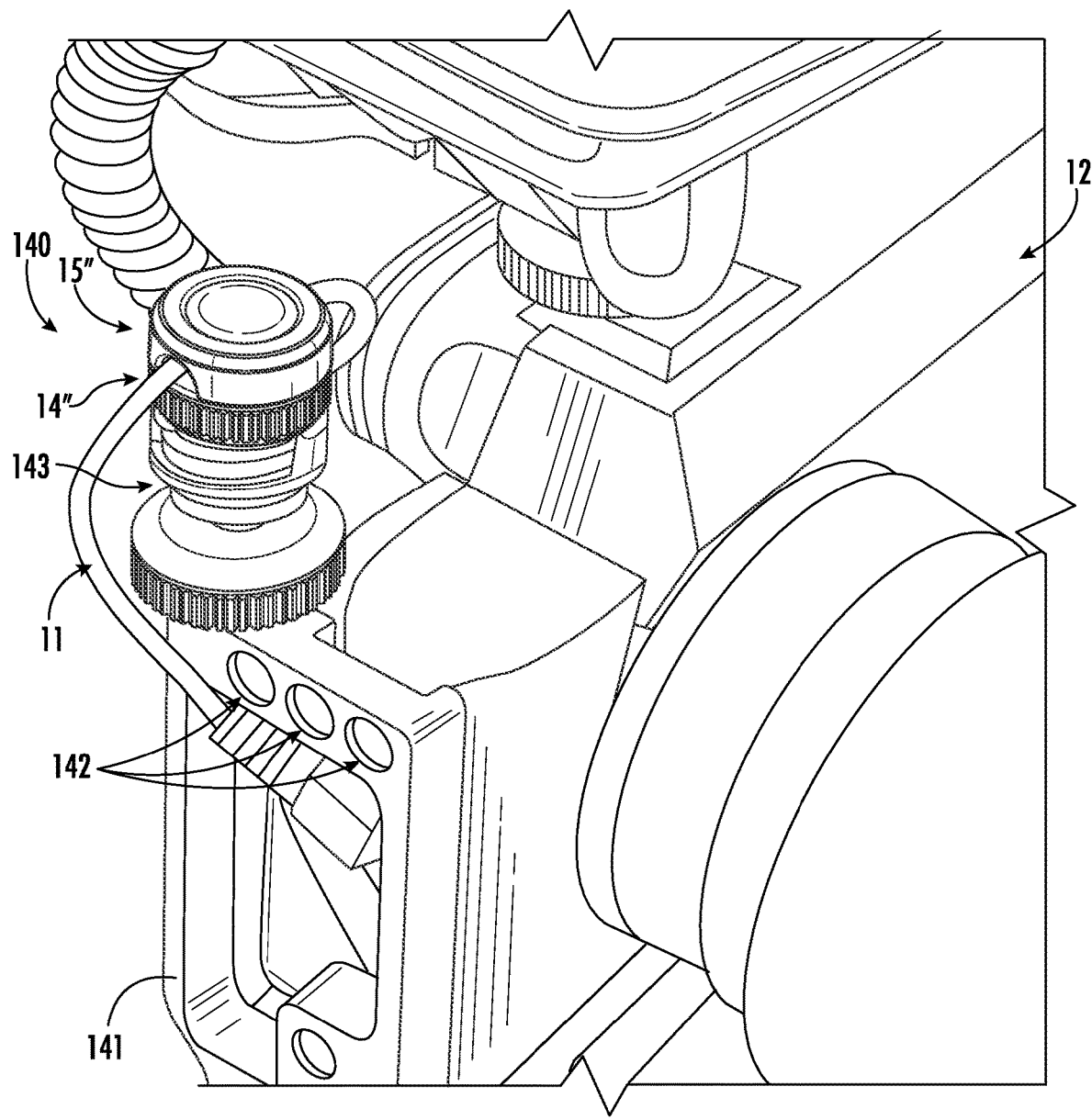
FIG. 8 is a perspective view of a cable arrest device on an electronic device.

Electronic devices frequently have mounting ports. For example, the camera 12 shown in FIG. 8 has a mounting port 142 on a camera cage 141. The camera cage is securely coupled to the side of the camera 12. Other devices have similar mounting ports, such as internally-threaded bores formed into housings. FIGS. 8-9B illustrate an alternate embodiment of a cable arrest device 140 which can be coupled to these ports 142 to secure the device 140 with respect to the electronic device itself.

The cable arrest device 140 effectively prevents the cable 11 from being accidentally removed from the camera 12, saving the photographer the annoyance of having to reconnect the cable 12 each time it would otherwise inadvertently be pulled out. The camera 12 is only exemplary of a device that contains a communications or data port, such as a laptop or tablet, and the cable 11 is exemplary of any cable, such as a USB cable, optical cable, or the like. The scope of the disclosure is not limited by these examples.

The cable arrest device 140 (hereinafter, the "device 140") is similar to the devices 10 and 110 and includes many of the same structural elements and features of those devices. For that reason, same structural elements and features are referred to with the same reference characters as used with respect to the device 10, but are marked with a double-prime ("''") designation to differentiate them from those of the device 10. For example, the device 140 includes a base 14" and a cap 15". All constituent structural elements and features of the base 14" and cap 15" are present and identical on the base 14" and cap 15", respectively; they are the same in every way. Not all of those elements and features are identified in FIGS. 8-9B to prevent cluttering of the drawings, but the reader will understand their structure and location from the earlier description of the device 10.

The device 140 has a different dock 143. While the dock 143 is similar to the dock 143, it contains a number of differences which allow the device 140 to be engaged with a mounting port 142, among other features.

Figure 9A:
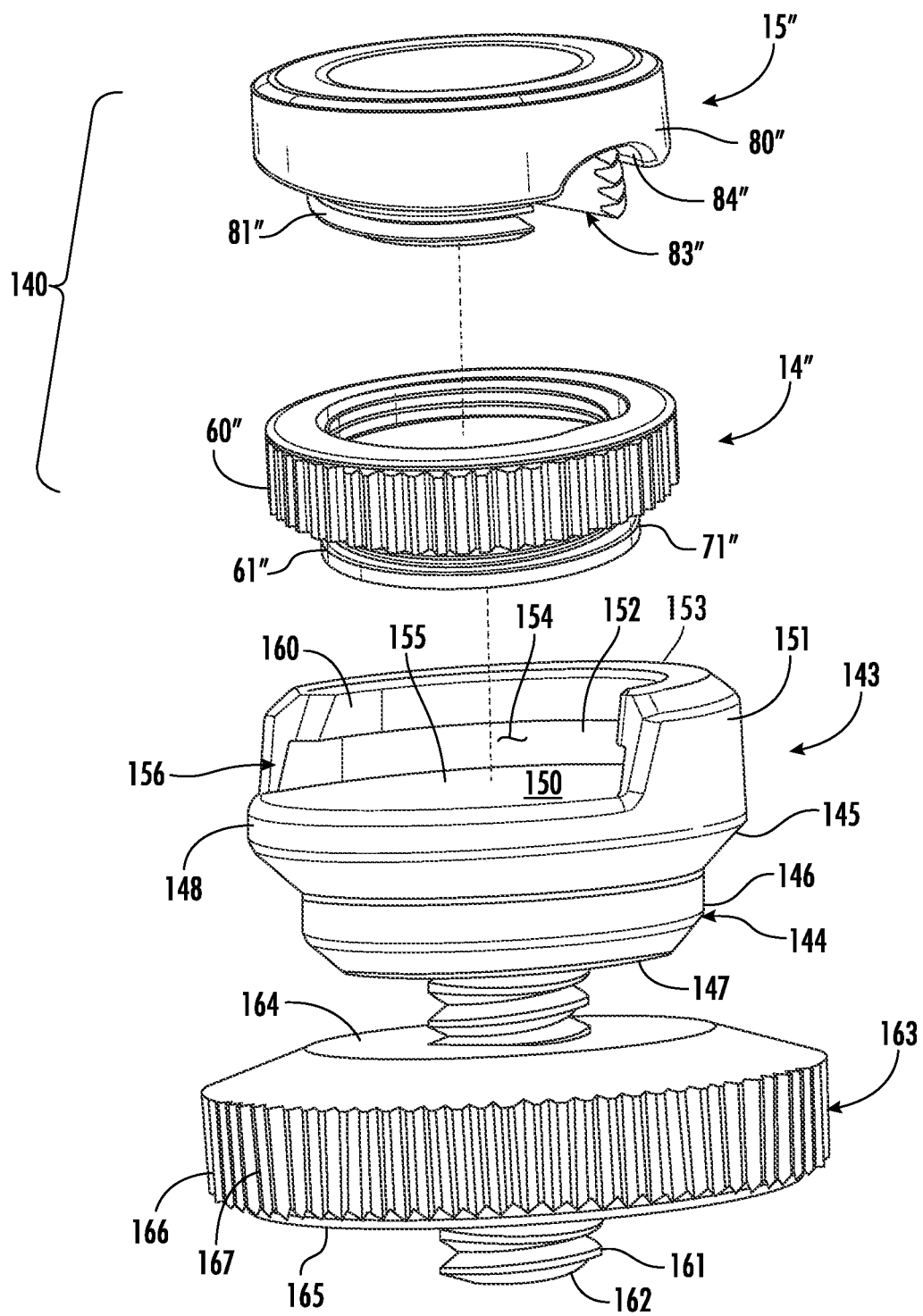
FIGS. 9A and 9B are top and bottom exploded perspective views of the cable arrest device of FIG. 8.
Figure 9B:
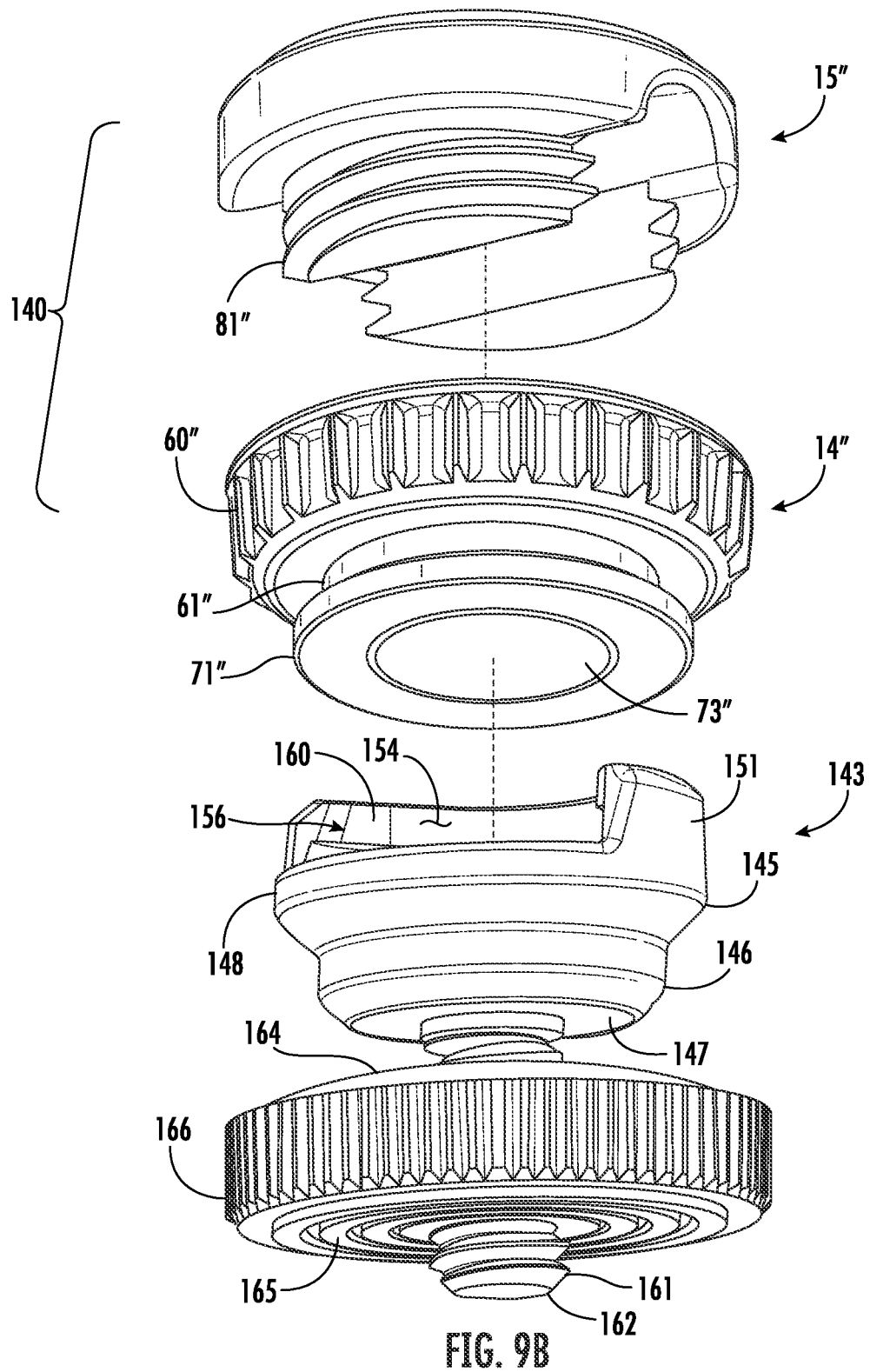

FIGS. 9A and 9B show the device 140 in exploded top and bottom perspective views. The dock 143 has a body which is roughly cylindrical, having a preferably circular cross-section of varying outer diameter. The dock 143 includes a bottom 144, which has two tiered portions: an upper portion 145 and a lower portion 146. The upper portion 145 includes a generally disc-shaped endwall 148 and a truncated conical portion extending downward to the lower portion 146. The lower portion 146 includes a generally disc-shaped section and a truncated conical portion extending downward therefrom to a flat lower surface 147. The truncated conical portion of the upper portion 145 tapers to the outer diameter of the disc-shaped section of the lower portion 146 which is less than the outer diameter of the endwall 148 of the upper portion 145. In this way, the bottom 144 is tiered or stepped down with its outer diameter. The top of the endwall 148 of the upper portion 145 is a surface 150 which is substantially flat and parallel with respect to the flat lower surface 147.

A sidewall 151 projects upwardly from the upper portion 145 at the perimeter of the endwall 148 of that upper portion 145. The sidewall 151 has an inner surface 152 which is smooth and cylindrical. The inner surface 152 is preferably normal to the endwall 148 and has a constant inner diameter. The sidewall 151 rises up to an edge 153 defining the top of the first side furthest from the endwall 148. The endwall 148 and the sidewall 151 cooperate to define a hold 154 in the first side. The hold 154 is an empty space or void for receiving the base 14 and is generally cylindrical. A magnetic element 155, or an element made of a magnetically-attractive material, is preferably carried in the endwall 148. In some embodiments, the magnetic element 155 covers the entire surface 150 of the endwall 148. In other embodiments, the magnetic element 155 covers only a portion of the surface 150. In other embodiments, the magnetic element 155 is located or set into the endwall 148. In other embodiments, the magnetic element 155 is set into the endwall 148 at the geometric center of the surface 150. In some embodiments, the magnetic element 155 is centrally disposed in the endwall 148 or is the endwall 148 itself, as is the case in the embodiment of FIG. 9A.

The sidewall 151 is severed, preferably being quasi- or semi-cylindrical. It preferably extends around only a back portion of the endwall 148, severing the sidewall 151 along a front portion of the endwall 148. That portion of the sidewall 151 along the back side of the dock 143 defines a back. Opposite that back, the hold 154 has a lateral opening 156 or mouth defined between the ends of the sidewall 151. The hold 154 also has a vertical opening or mouth extending upward from the hold 154.

Like the second side 21 of the dock 13, the sidewall 151 turns inwardly at the edge 153 along the back, defining a lip 160 projecting into the hold 154. The lip 160 overhangs the hold 154, extending slightly inward in a radial direction around the back side. The lip 160 helps capture the base 14 when applied to the hold 154.

Unlike the dock 13, the dock 143 includes a shank 161 extending downward from the bottom 144. The shank 161 has a first end, embedded within or otherwise secured to the bottom 144, and an opposite second, free end 162. The shank 161 has threads formed on its outer surface entirely from the bottom 144 to the free end 162.

A knob 163 is carried on the shank 161. The knob 163 is generally disc-shaped, having a top 164 and opposed bottom 165 and a perimeter edge 166 therebetween. The knob 163 tapers from the edge 166 to the top 164 and is generally flat along the entire bottom 165. The edge 166 carries a texture such as ribbing, knurling, or other like texturing.

In operation, the device 140 is useful for preventing a cable from being yanked or forcefully pulled out of a communications or data port when coupled to a device such as a camera, tablet, laptop, or other item. In one method of operation, the dock 143 is first secured to the camera 12 by threadably engaging the shank 161 into a mounting port 142, such as the one shown in FIG. 8 on the camera cage 141. This securely connects the dock 143 on the camera 12 (or other device, as the case may be). The base 14" and cap 15" are then both taken up by hand and placed on either side of the cable 11.

The photographer places the cable 11" into the slot 83" in the cap 15", preferably nesting it upwards against the bore 84" in the underside of the head 80". Then, the photographer registers and directs the threaded shank 81" of the cap 15" toward the cup 60", moving the shank 81" into the cup 60" and then rotating it so as to threadably engage the shank 81" and cup 60". The photographer rotates and threadably engages the base 14" and cap 15" to each other until he believes the cable 11 is appropriately secured. Compression between the bore 84" of the cap 15" and the edge 66" of the base 14" secures the cable 11; the cable 11 becomes caught on one side by the bore 84" and on the opposing side by the edge 66". If desired, the photographer can gently tug on the cable 11 while holding the coupled base 14" and cap 15" to see if the cable 11 does move with respect to the base 14" and cap 15". If it does slip, the photographer may wish to rotate and tighten the cap 15" onto the base 14" a little more.

When the photographer has secured the cable 11 in the base 14" and cap 15" as desired, he can connect that lock assembly 18" to the dock 143. He first takes up the camera 12 in his hand, holding it upright so that the dock 143 and its hold 154 are available to receive the base 14". The photographer then additionally grasps the assembled base 14", cap 15", and cable 11, and directs the base 14" downward toward the dock 143.

The outer diameter of the flange 71" is just slightly smaller than the inner diameter of the hold 154, but the outer diameter of the cup 60" is greater than the inner diameter of the hold 154. The vertical distance between the bottom of the base 14" and the underside of the cup 60" corresponds to the height of the sidewall 151 between the surface 150 and the edge 153. As such, the hold 154 is sized and shaped to closely receive the entire stem 61" of the base 14".

The photographer moves the base 14" down over the dock 143 but slightly offset from the hold 154. The base 14" is then moved down and into the lateral opening 47" of the hold 154, only partially over the surface 150. With the bottom of the base 14" partially in contact with the surface 150, the photographer then slides the base 14" laterally through the lateral opening 47" and across the surface 150. At a point, magnetic attraction between the magnetic elements 155 and 73" causes the stem 61 to snap laterally into the hold 154, thereby securely seating the base 14" in the dock 143.

The base 14" is further secured in the dock 143 by the lip 160. The cap 15" is secured in the base 14 with the threaded engagement therebetween. The base 14" is secured in the dock 143 by the engagement between the flange 71" and the lip 160. The flange 71" fits under the lip 160. The inner diameter defined by the lip 160 is smaller than the outer diameter defined by the flange 71". The lip 160 therefore prevents the flange 71" from being moved upwardly out of the hold 154; if a jerk pulls the base 14 upwardly, interaction of the flange 71" with the lip 160 entirely prevents removal of the base 14" from the dock 143. Because the cap 15" is engaged to the base 14", and the cable 11 is captured between the base 14" and the cap 15", the cable 11 is now secured with respect to the dock 143 on the second side of the dock 143.

When so secured, the base 14" is not removable from the dock 143 without precisely a certain type of orientation of the cable 11 and the dock 143. The overhanging lip 160 interacts with the flange 71" to prevent upward movement of the base 14" off the dock 143. The magnetic attraction forces between the magnetic elements 73" and 155, and the engagement of the lip 160 and the flange 71", prevent decoupling of the base 14 and dock 143.

Nevertheless, the base 14" can still be removed from the dock 143. The lip 160 overhangs the hold 154 only along the back side of the dock 143; the sidewall 151 and lip 160 are both missing along the front side, where the lateral opening 156 is. As such, when the cable is oriented particularly such that the pull force is directed outward through the lateral opening 156, the lock assembly 18" of the base 14" and cap 15" can be decoupled and removed from the dock 143 along that same direction. If the pull force is directed along another orientation, the force will not decouple the base 14" from the dock 143.

This effectively prevents the cable 11 from being accidentally removed from the camera 12, saving the photographer the annoyance of having to reconnect the cable 11 each time it would be otherwise inadvertently pulled out. The camera 12 is only exemplary of a device that contains a communications or data port, such as a laptop or tablet, and the cable 11 is exemplary of any cable, such as a USB cable, optical cable, or the like. The scope of the disclosure is not limited by these examples.

Figure 10:
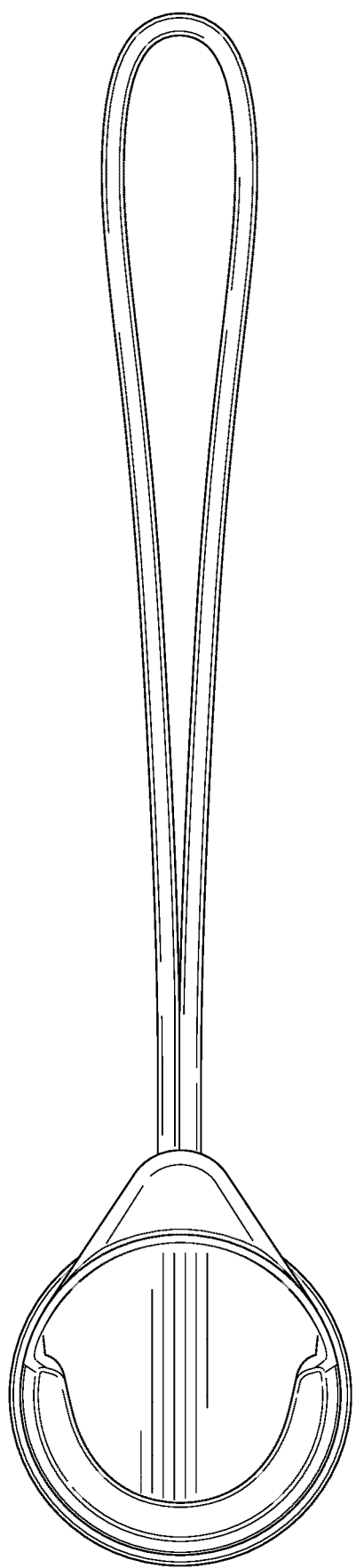
Figure 11:
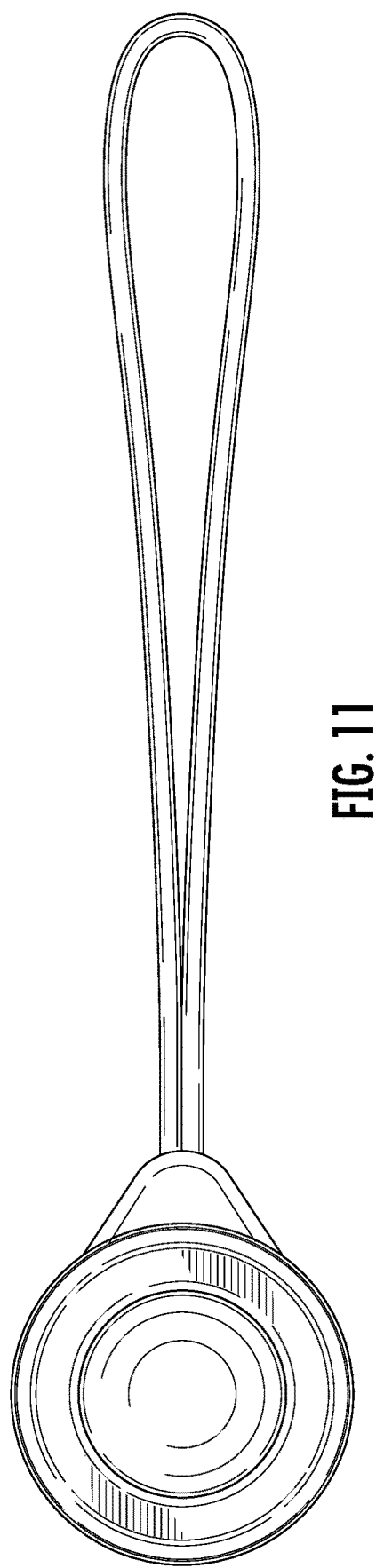
Figure 12:
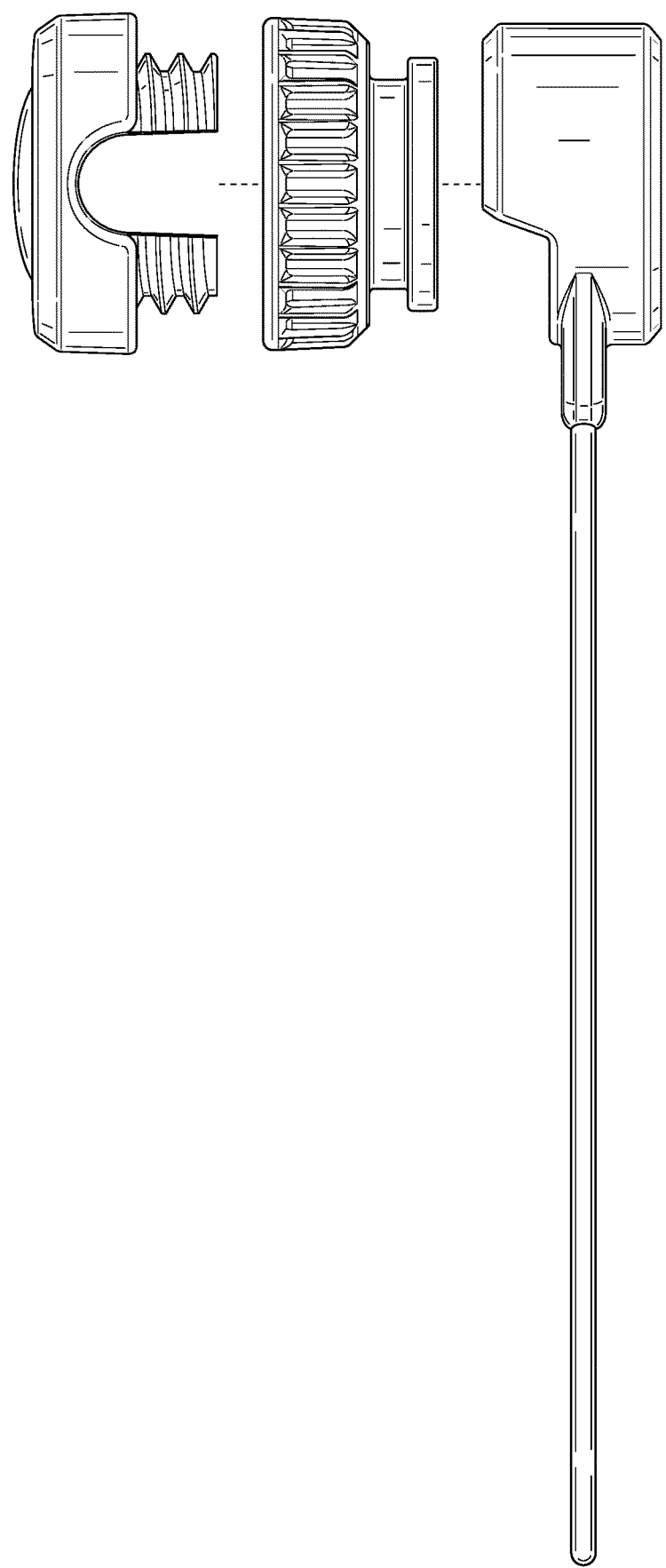
Figure 15:
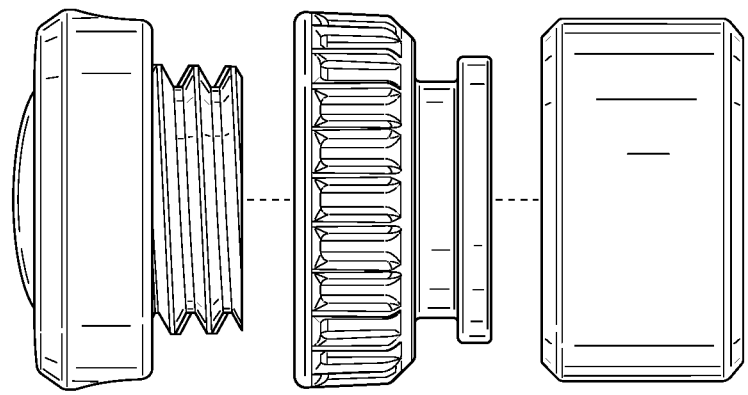
Figure 14:
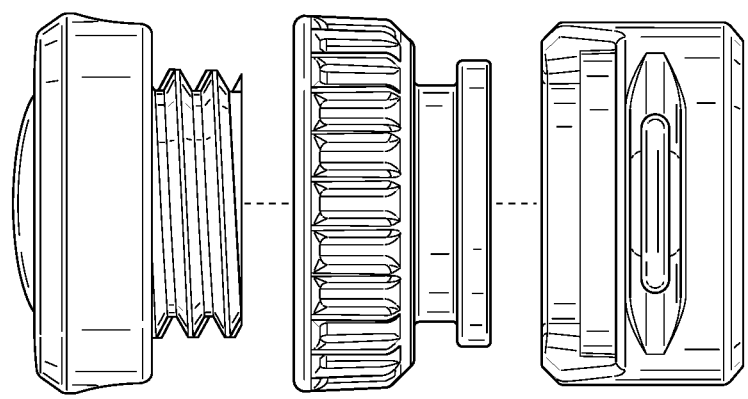

FIG. 10 show embodiments of the devices 10, 110, and 140 in different views, such as a top plan view (FIG. 10), bottom plan view (FIG. 11), right side elevation view (FIG. 12), left side elevation view (FIG. 13), front elevation view (FIG. 14), and rear elevation view (FIG. 15). Such views may assist the reader in better understanding the embodiments.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A cable arrest device for securing a cable, the device comprising:
 a dock;
 a base removably coupled to the dock;
 a cap removably coupled to the base; and
 a gate formed between the base and cap, the gate having a dimension and being configured to receive the cable therethrough;
 wherein relative movement of the cap and the base adjusts the dimension of the gate.

2. The cable arrest device of claim 1, wherein:
 the dock includes a first hold and a second hold disposed on opposite sides of the dock;
 when the base is in the first hold, the base is removable from the first hold in only a single first direction; and
 when the base is in the second hold, the base is removable from the second hold in only a second direction transverse to the first direction.

3. The cable arrest device of claim 2, wherein:
 the dock includes an endwall between the two opposite sides of the dock, the endwall having a perimeter;
 the first hold includes a cylindrical sidewall extending upward from the endwall and extending continuously around the perimeter; and
 the second hold includes a quasi-cylindrical sidewall extending upward from the endwall and extending partially around the perimeter.

4. The cable arrest device of claim 3, wherein the second hold includes an overhanging lip formed on an edge of the quasi-cylindrical sidewall, which overhanging lip is directed radially inward into the second hold.

5. The cable arrest device of claim 4, wherein the base includes a stem terminating with a flange, and the flange fits under the overhanging lip when the base is coupled to the dock.

6. The cable arrest device of claim 1, wherein:
 the cap includes an enlarged head and a threaded shank depending from the head;
 the base includes a cup configured to receive the shank of the cap;
 a slot severs the shank and partially severs the head of the cap; and
 when the base receives the cap, the slot of the cap cooperates with the base to form the gate.

7. The cable arrest device of claim 6, wherein the slot defines a semi-circular bore in the head of the cap.

8. A cable arrest device for securing a cable, the device comprising:
 a dock;
 a lock assembly comprising a base and cap removably coupled to each other;
 the lock assembly includes a gate with a dimension adjustable in response to relative movement of the base and the cap, the gate configured to receive the cable therethrough; and
 the dock receives the lock assembly to non-permanently engage the lock assembly to the dock.

9. The cable arrest device of claim 8, wherein when the lock assembly is engaged to the dock, only a force of a defined magnitude and orientation disengages the lock assembly and the dock.

10. The cable arrest device of claim 8, wherein when the lock assembly is engaged to the dock, decoupling of the lock assembly and dock is disabled without a force of defined magnitude and orientation.

11. The cable arrest device of claim 8, wherein:
 the dock includes a first hold and a second hold disposed on opposite sides of the dock;
 when the base is in the first hold, the base is removable from the first hold in only a single first direction; and
 when the base is in the second hold, the base is removable from the second hold in only a second direction transverse to the first direction.

12. The cable arrest device of claim 11, wherein:
 the dock includes an endwall between the two opposite sides of the dock, the endwall having a perimeter;
 the first hold includes a cylindrical sidewall extending upward from the endwall and extending continuously around the perimeter; and
 the second hold includes a quasi-cylindrical sidewall extending upward from the endwall and extending partially around the perimeter.

13. The cable arrest device of claim 12, wherein:
 the second hold includes an overhanging lip formed on an edge of the quasi-cylindrical sidewall which is directed radially inward into the second hold; and
 the base includes a stem terminating with a flange, and the flange fits under the overhanging lip when the base is coupled to the dock.

14. The cable arrest device of claim 8, wherein:
 the cap includes an enlarged head and a threaded shank depending from the head;
 the base includes a cup configured to receive the shank of the cap;
 a slot severs the shank and partially severs the head of the cap; and
 when the base receives the cap to form the lock assembly, the slot of the cap cooperates with the base to form the gate.

15. A cable arrest device for securing a cable, the device comprising:
 a dock;
 a lock assembly comprising a base and a cap removably coupled to each other;
 the lock assembly includes a gate with a dimension adjustable in response to relative movement of the base and the cap, the gate configured to receive the cable therethrough; and
 when the lock assembly is received by the dock, decoupling of the lock assembly and dock is disabled without a force of sufficient magnitude and particular orientation.

16. The cable arrest device of claim 15, wherein:
 the dock includes a first hold and a second hold disposed on opposite sides of the dock;
 when the base is in the first hold, the base is removable from the first hold in only a single direction; and
 when the base is in the second hold, the base is removable from the second hold in only a second direction transverse to the first direction.

17. The cable arrest device of claim 16, wherein:
 the dock includes an endwall between the two opposite sides of the dock, the endwall having a perimeter;

the first hold includes a cylindrical sidewall extending upward from the endwall and extending continuously around the perimeter; and the second hold includes a quasi-cylindrical sidewall extending upward from the endwall and extending partially around the perimeter.

18. The cable arrest device of claim 17, wherein:

the second hold includes an overhanging lip formed on an edge of the quasi-cylindrical sidewall which is directed radially inward into the second hold; and the base includes a stem terminating with a flange, and the flange fits under the overhanging lip when the base is coupled to the dock.

19. The cable arrest device of claim 15, wherein:

the cap includes an enlarged head and a threaded shank depending from the head;

the base includes a cup configured to receive the shank of the cap;

a slot severs the shank and partially severs the head of the cap; and when the base receives the cap to form the lock assembly, the slot of the cap cooperates with the base to form the gate.

20. The cable arrest device of claim 19, wherein the slot defines a semi-circular bore in the head of the cap.

* * * * *